United States Patent [19]
Juncker et al.

[11] Patent Number: 5,392,507
[45] Date of Patent: Feb. 28, 1995

[54] METHOD OF POSITIONING MAGNETIC HEADS ON A TURNTABLE

[75] Inventors: Richard Juncker, Chaville; Pierre Abeille, Antony, both of France

[73] Assignee: Schlumberger Industries, Inc., Montrouge, France

[21] Appl. No.: 109,547

[22] Filed: Aug. 20, 1993

Related U.S. Application Data

[62] Division of Ser. No. 897,115, Jun. 11, 1992, Pat. No. 5,287,236.

[30] Foreign Application Priority Data

Jun. 12, 1991 [FR] France .................. 91 07133

[51] Int. Cl.⁶ ............................................. G11B 5/42
[52] U.S. Cl. ................................. 29/603; 360/107
[58] Field of Search ............... 29/603; 360/107, 108

[56] References Cited

U.S. PATENT DOCUMENTS 4,316,225 2/1982 Marayama et al. .................. 360/107
5,010,432 4/1991 Fukushima et al. ............ 360/107 X Primary Examiner—Carl E. Hall
Attorney, Agent, or Firm—Asman, Sanford J.

[57] ABSTRACT

A method for quickly and accurately positioning the rotary magnetic heads of a recorder/reader unit. The support for the magnetic heads includes a turntable and a countertable that are circular and that have a common axis of rotation, each including a peripheral support zone and a central support zone. The magnetic heads are situated around the periphery of the turntable. A screw enables the peripheral support zones to be brought into contact with each other and then the central support surfaces to be brought into contact with each other. The invention is applicable to recording and/or reading information on a magnetic tape.

8 Claims, 6 Drawing Sheets

METHOD OF POSITIONING MAGNETIC HEADS ON A TURNTABLE

This application is a division of U.S. patent application Ser. No. 07/897,115, filed on Jun. 11, 1992, entitled A METHOD AND APPARATUS FOR RECORDING AND/OR READING INFORMATION ON A MAGNETIC TAPE, now U.S. Pat. No. 5,287,236.

The present invention relates to a method and apparatus for recording and/or reading information on a magnetic tape, and it relates more precisely to a support for rotating magnetic heads and to a method enabling the magnetic heads to be positioned accurately.

The invention relates to apparatus comprising a stationary cylinder constituted by a bottom drum and a coaxial top drum, with a coaxial rotary support being disposed between the drums and including at least one recording and/or reading head on its periphery. A magnetic tape is suitable for being displaced over the cylinder and information is then stored or read on the magnetic tape using the magnetic head(s).

BACKGROUND OF THE INVENTION

The recording and reading of data on a magnetic tape using an apparatus including one or more rotating magnetic heads has been known for a long time.

Such magnetic heads are generally fixed, e.g. by gluing, to the periphery of a turntable in the form of a disk which rotates inside a stationary cylinder and about an axis of rotation that coincides with the longitudinal axis of the cylinder. The magnetic heads move in an equatorial slot of the cylinder. The turntable is generally fixed to a countertable by means of screws at the periphery of the turntable. This method of fixing gives rise to stresses and thus to deformation which interferes with proper alignment of the magnetic heads which need to be aligned in a height direction with an accuracy close to 1 micron. It can thus be seen how important it is to have a method and apparatus enabling the magnetic heads to be positioned properly. In addition, magnetic heads wear or break and it is necessary to change the turntable supporting them regularly. This operation is generally lengthly since it requires the magnetic heads or the turntable containing them to be repositioned relative to its support in the recorder.

SUMMARY OF THE INVENTION

The present invention provides apparatus supporting magnetic heads that does not require any positioning adjustment of the heads when the support is installed in a recorder/reader unit. Installation of the support is thus easy and quick. The invention also relates to a method of quickly and accurately positioning the magnetic heads of a recorder/reader unit. The invention also proposes a case that co-operates with the magnetic head support and enables the support to be installed or removed quickly in a recorder/reader unit without running the risk of damaging the magnetic heads and without readjusting the heads.

More precisely, the present invention provides apparatus for recording and/or reading information on a magnetic tape, the apparatus comprising a cylinder provided with a slot and a support for rotary magnetic heads mounted inside said cylinder and enabling said magnetic heads to be positioned relative to the slot of said cylinder, the magnetic head support comprising a turntable and a countertable sharing a common axis of rotation, each being substantially in the form of a disk and each including a peripheral support zone and a central support surface, said turntable including said magnetic heads around its periphery, and means for putting the peripheral support zones into contact with each other and for putting the central support surfaces into contact with each other.

In a preferred embodiment, the turntable and the countertable are fixed to each other solely by a central screw.

Advantageously, the central support surfaces are in the form of rings centered on the common axis of rotation, and the peripheral support zones are in the form of a ring that is interrupted by openings through which the magnetic heads pass.

According to a feature of the invention, when the peripheral support zones come into contact, the central support surfaces are not yet in contact with each other. The central support surface and the peripheral support zone of the turntable lie on a theoretical surface that is concave in shape so long as the peripheral support zones are not in contact with each other. Under such circumstances, the peripheral support zone and the central support surface of the countertable lie in the same plane perpendicular to the common axis of rotation.

The apparatus includes means for angularly indexing the turntable and the countertable relative to each other. These means are advantageously a slot or a hole co-operating with a pin.

The invention also relates to a case enabling the turntable to be installed or removed easily without risk of damaging the magnetic heads. The case comprises a turntable support provided with an angular indexing stud and screws for fixing to the turntable, a protective box provided with means for fixing the turntable support inside the protective box, and optionally a lid closing the protective box.

The invention also provides a method of positioning the rotary magnetic heads of a recorder/reader unit for magnetic tapes, the magnetic heads being fixed at the periphery of a rotary turntable which includes a central surface and a peripheral zone, said turntable being designed to be fixed to a countertable which also includes a central surface and a peripheral zone, the method comprising the following steps:

a/ said turntable is machined so that said central surface is set back relative to a plane containing said peripheral zone and perpendicular to the axis of rotation of the rotary turntable;

b/ the turntable is fixed on a standard countertable in a laboratory and the magnetic heads are positioned on the turntable;

c/ the positioning of the magnetic heads is adjusted and the magnetic heads are fixed to the turntable;

d/ the turntable is dismounted from the countertable; and e/ the turntable is mounted on the countertable of the recorder/reader unit by initially pressing said peripheral zones against each other and then pressing said central zones against each other.

In an advantageous implementation, the turntable is machined by lapping while exerting a greater pressure force on its central surface than on its peripheral zone.

According to another feature of the invention, the turntable is fixed to the countertable by a central screw.

Advantageously, the turntable is placed in a case, either for storage purposes to protect it from damage it could receive, e.g. due to a shock, or else for mounting it on the countertable of a recorder/reader unit while protecting the magnetic heads from possible shock. The turntable is fixed to a turntable support which is itself fixed to a protective box. The box may be closed by a lid.

According to another feature of the method, when it is desired that the turntable should be removed from the countertable: the turntable is placed in a predetermined angular position; the turntable support is positioned and fixed on the turntable; the protective box is positioned and fixed on the turntable support; the turntable is disconnected from said countertable; and the assembly constituted by the turntable, the turntable support, and the protective box is extracted from the recorder/reader unit. This assembly may advantageously be closed by a lid.

BRIEF DESCRIPTION OF THE DRAWINGS

An embodiment of the invention is described by way of example with reference to the accompanying drawings, in which.

DETAILED DESCRIPTION

Figure 1:
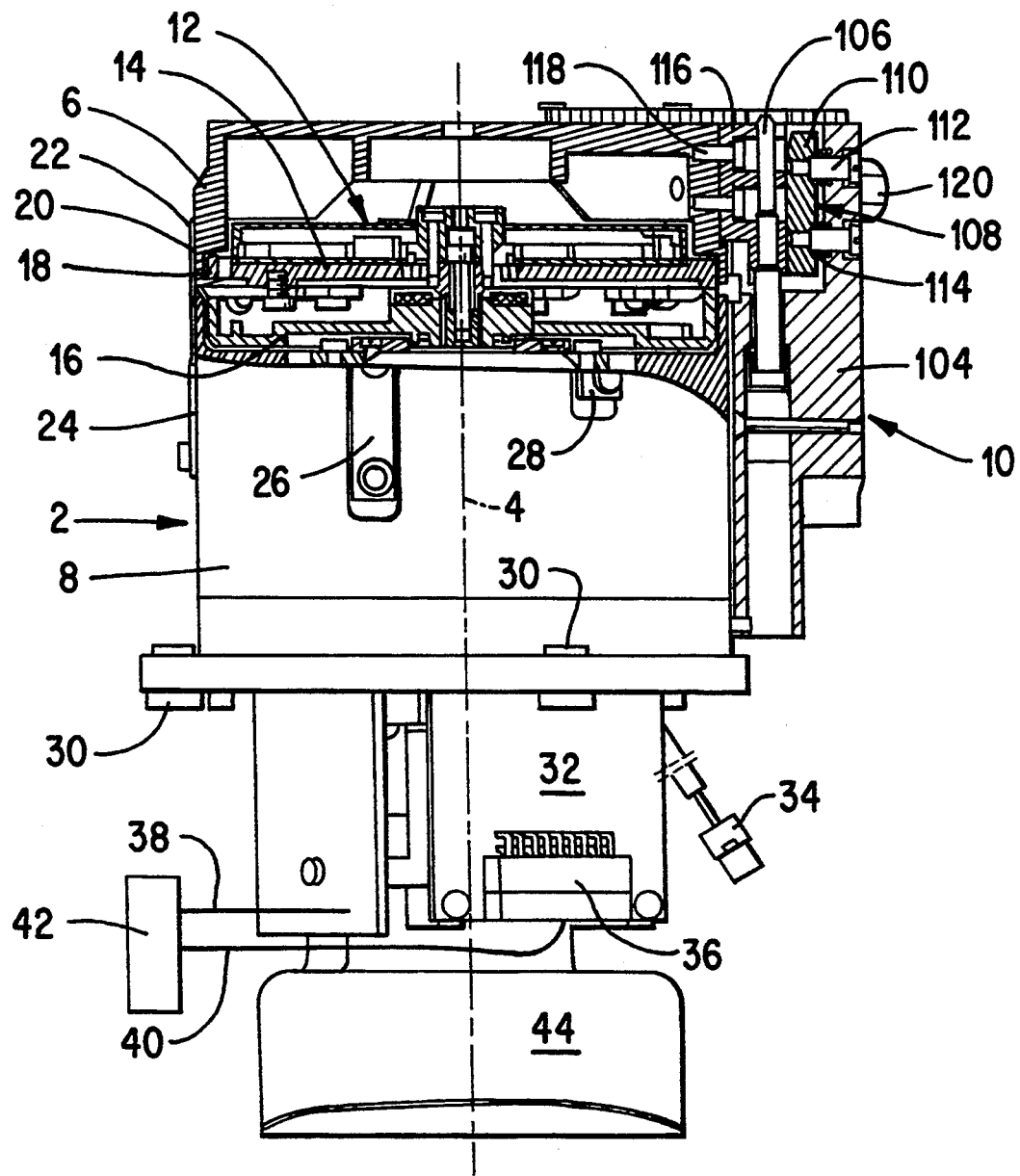
FIG. 1 is a fragmentary section view through a scanner of a magnetic tape recorder/reader unit.

The scanner shown in FIG. 1 comprises a fixed cylinder 2 about a longitudinal axis 4 and made up of a top drum 6 and a bottom drum 8. These drums are stationary and coaxial, having the axis 4 in common. The top and bottom drums are fixed together by fixing means 10. The scanner also includes a magnetic head support 12 comprising a turntable 14 and a countertable 16. The turntable 14 and the countertable 16 are substantially disk-shaped having a common axis of rotation that coincides with the longitudinal axis 4 of the cylinder 2. Magnetic heads 18 are fixed at regular intervals to the periphery of the turntable 14 and they are positioned in a slot 20 which is left free between the two drums 6 and 8. A magnetic tape represented diagrammatically at 22 is capable of moving over the slot 20 and thus over the magnetic heads 18 for the purpose of reading and/or writing information on the tape. Tape guides 24, 26, and 28 are disposed on the surface of the bottom drum 8 following a helical path.

The scanner of FIG. 1 also includes means (not shown) for causing the turntable and the countertable to rotate, means 30 for fixing the scanner to a plate of the recorder/reader unit, an enclosure 32 containing various electronic circuits, an electrical power supply connector 34, a wire connection strip 36, electrical connectors 38 and 40, and a plug 42 for inputting and outputting various electrical signals for operating the scanner, together with an enclosure 44 containing an encoder for servo-controlling the angular position of the turntable 14 and of the countertable 16.

Figure 2:
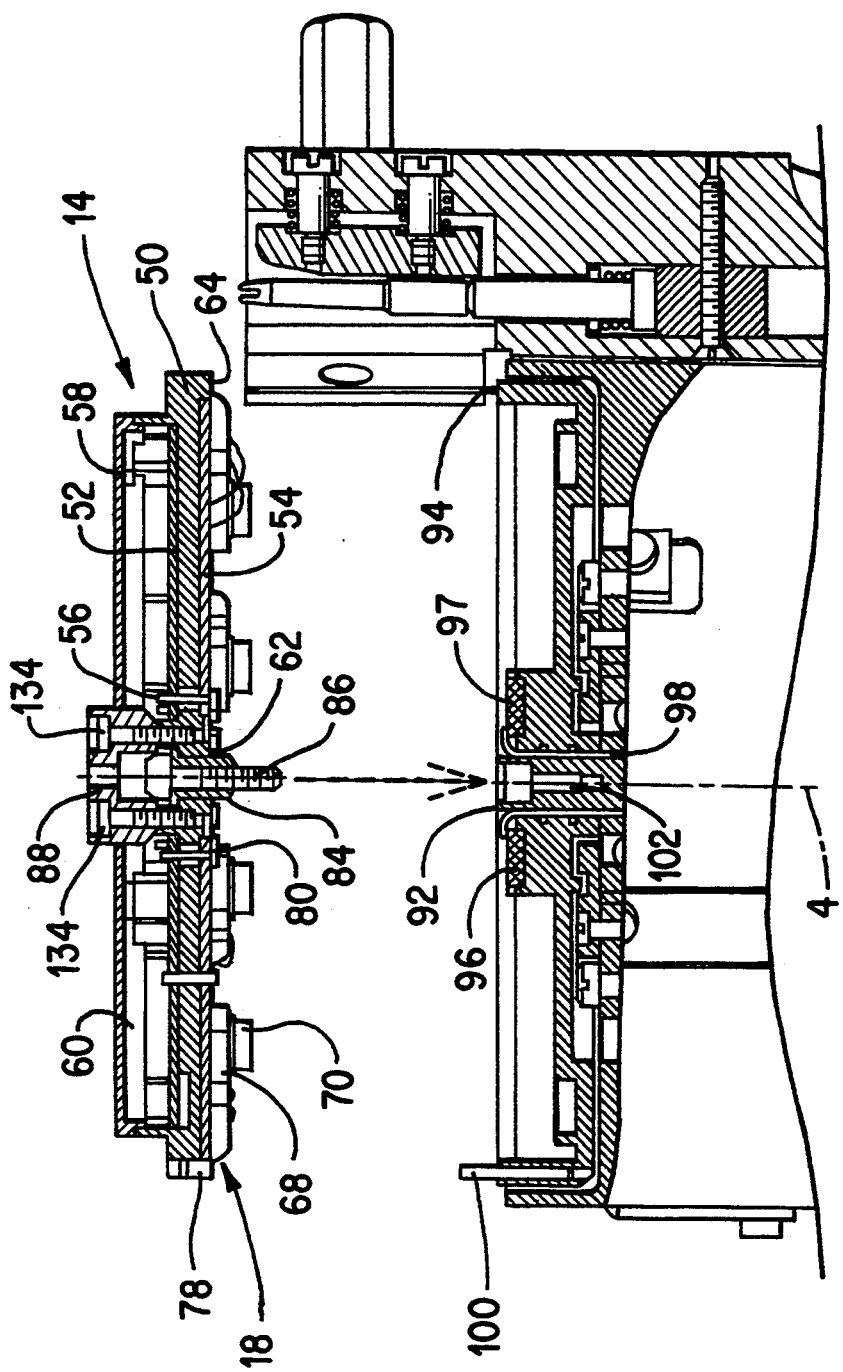
FIG. 2 shows how the turntable is assembled on the countertable.
Figure 3:
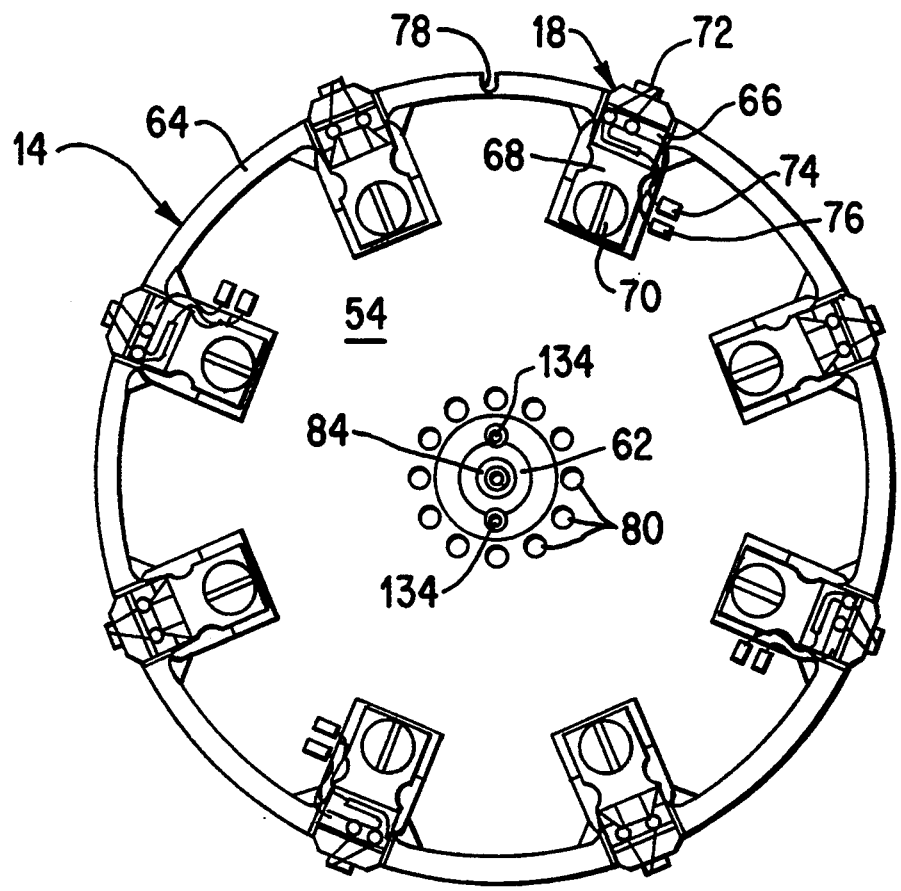
FIG. 3 is a view from beneath of the turntable carrying its magnetic head.

With reference to FIGS. 2 and 3, it can be seen that the turntable is substantially in the form of a disk having the longitudinal axis 4 of the cylinder as its axis of rotation. The turntable is constituted mainly by a metal structure 50 which is sandwiched between two electrically insulating plates 52 and 54 which serve as supports for electrical or electronic circuits. Electrical connectors 56 serve to provide electrical connections between the two electronic circuit plates 52 and 54. A screening lid 58 isolates the top portion of the turntable. A space 60 is left free to accommodate the volume of the electronic components. The turntable includes a central support surface 62 that is annular in shape and is centered around the axis of rotation 4. The turntable also includes a peripheral support zone 64 (see FIG. 3) in the form of a ring situated at the periphery of the turntable. This ring is interrupted by housings 66 for passing the magnetic heads 18. In the example shown, there are eight magnetic heads, but this number could be different. The magnetic heads are regularly spaced apart at the periphery of the turntable 14.

Each magnetic head comprises a base 68 fixed to the turntable 14 by a screw 70. A magnetic head per se 72 is fixed at the end of the base 68 and it is connected to an electronic circuit (not shown) by connection wires 74 and 76. The magnetic head per se 72 is glued to the base and is positioned relative to the frame of reference constituted by the turntable. This positioning operation is well known and makes use of optical means. The frame of reference of the turntable is constituted by its axis (shaft referenced 84), by the plane 122 formed by the peripheral zones 94 and the central surfaces 92 of the countertable when not stressed by assembly to the turntable, and finally by an angle reference. The turntable includes a slot 78 for angular indexing purposes. Such purposes may be achieved by any other means, e.g. by means of a hole. Tabs 80 provide electrical connection by contact with metal areas 82 of the countertable.

The turntable 14 also includes a shaft 84 centered on the axis of rotation 4. A screw 86 for fixing the turntable to the countertable is received in said shaft 84. It is retained when unscrewed by means of a part 88 that holds it captive. In addition, at the end of the unscrewing stroke, the turntable moves upwards when the screw continues to be unscrewed, thereby withdrawing the shaft 84 from its housing in which it is lightly clamped (in order to avoid mechanical play).

Figure 4:
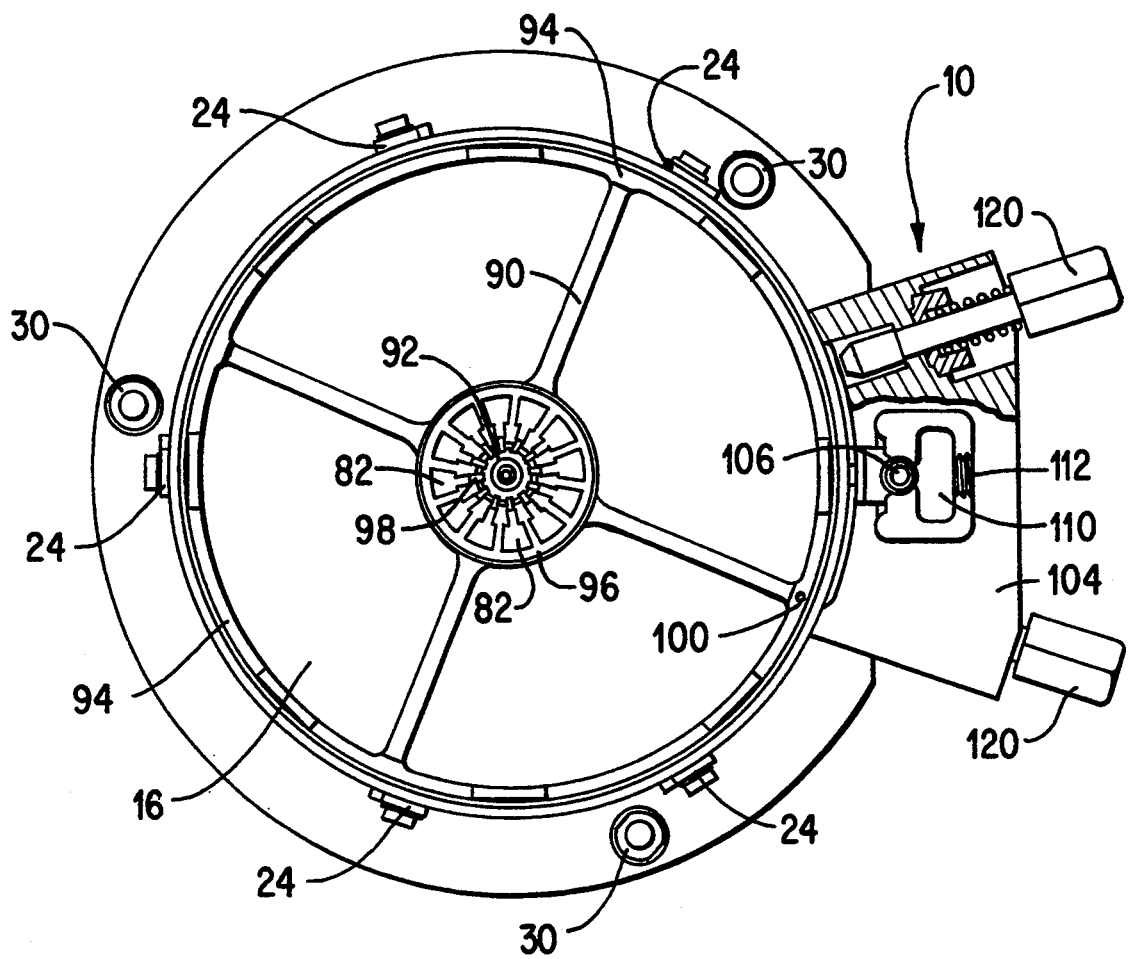
FIG. 4 is a view from above of the countertable together with the means for fixing the top drum to the bottom drum.

With reference to FIGS. 2 and 4, it can be seen that the countertable 16 is substantially in the form of a disk of the same size as the turntable 14. The countertable 16 includes ribs 90 for increasing its mechanical stiffness. It includes a central support surface 92 that is annular in shape and that is centered around the axis of rotation of the countertable, and it also includes a peripheral support zone 94. This support zone is in the form of a ring centered on the axis of rotation and situated at the periphery of the countertable 16. This ring is interrupted at the magnetic head 18. Electrically conductive areas 82 are disposed in a ring around the axis of rotation and they rest against an electrically insulating sheet 96 (e.g. made of "Mylar"). This sheet is also placed on a resilient support 97 which serves to provide contact pressure between the areas 92 and the tabs 80 on the turntable. Each area 92 is connected to a conductor wire 98 which runs along the axis of rotation towards the electrical circuit of the scanner. A pin 100 provides angular indexing for the countertable. This pin co-operates with the slot 78 of the turntable.

In FIG. 4, there can also be seen the fixing means 30 for fixing the scanner to the baseplate of the recorder, together with the magnetic tape guides 24 and the fixing means 10 for fixing the top drum 6 to the bottom drum 8.

To position the turntable 14 on the countertable 16, the turntable 14 is initially oriented relative to the countertable 16 so that its indexing pin 100 enters into the slot 78. The peripheral support zones 64 of the turntable come into contact with the peripheral support zones 94 of the countertable. As described below with reference to FIG. 5, in this position the central support surfaces 62 and 92 are not yet in contact with each other because of the special shape given to the turntable 14. The countertable 16 includes a bore 102 pierced along its axis of rotation and provided with tapping. The screw 86 of the turntable 14 engages in the tapping of the bore 102, and the screw is tightened until the central support surfaces 62 and 92 come into contact. The shaft 84 is received in the bore 102 in a manner that provides a small amount of clamping. The magnetic heads are then accurately positioned and they face the slot 20 over which the magnetic tape passes.

The fixing means for fixing the top drum 6 to the bottom drum 8 enable the surfaces of these drums to be accurately aligned at the slot 2 so as to form a smooth surface over which the magnetic tape runs. With reference to FIGS. 1 and 4, it may be observed that the fixing means 10 comprise a main part 104 which is substantially in the form of a truncated V-shape (see FIG. 4) and which is fixed to the bottom drum 8. The central portion of this main part 104 includes a recess that receives both an adjustment screw 106 and a brake device 108 comprising a shoe 110 supported by two guides 112 and urged by springs 114 against a guide part 116 of the top drum 6. The part 116 is held by two screws 118 and it is substantially T-shaped. When the screw 106 is unscrewed, the guide 116 rises with the top drum. By pressing against the guide 116, the shoe 110 prevents the top drum from dropping down since that could damage the magnetic heads. This also applies when the top drum is installed. Two screws 120 are used for locking the top drum once it is in position.

Figure 5:
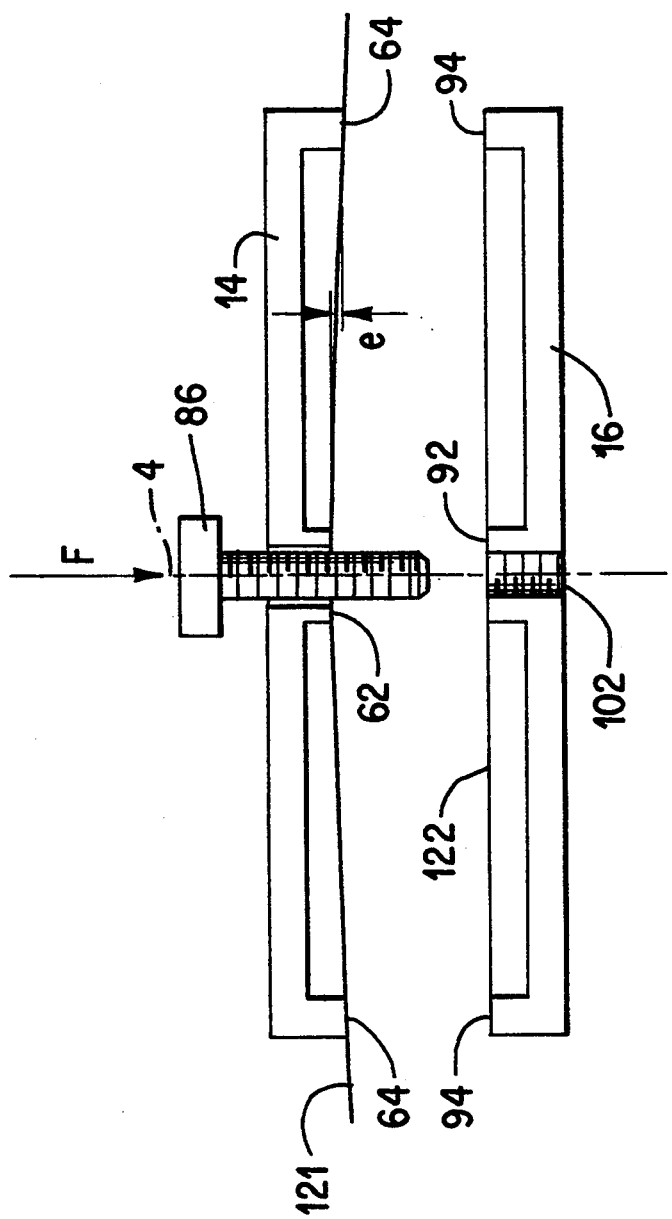
FIG. 5 illustrates the principle on which the present invention is based for quickly and easily positioning the magnetic heads.

In FIG. 5 which is a diagram showing how the magnetic heads are positioned, the turntable 14 and the countertable 16 are shown highly diagrammatically in section. When the turntable 14 and the countertable 16 are not fixed together, the central support surface 92 and the peripheral support surface 94 of the countertable 16 lie in the same plane 122 perpendicular to the axis of rotation 4. In contrast, the central support surface 62 and the peripheral support zone 64 of the turntable 14 do not lie in the same plane as each other, and the central surface 62 is set back a little through a distance e relative to the peripheral support zone 64. It could be said that the central surface 62 and the peripheral zone 64 lie on a theoretical surface 121 that is concave in shape. The distance e representing the offset is about 50 microns. By mowing the turntable 14 towards the countertable 16, the peripheral support zones 64 and 94 make contact initially, leaving the central support surfaces 62 and 92 separated by the distance e. By tightening the screw 86 in the tapping of the bore 102, the central surfaces 62 and 92 are moved towards each other until they come into contact. This is possible because the turntable 14 and the countertable 16 possess a degree of flexibility. Once the screw 86 has been tightened, the countertable 16 is slightly deformed and the plane 122 is curved.

Advantageously, the offset of depth e between the central surface 62 and the peripheral support zone 64 of the turntable 14 is made by lapping the turntable on a surface that is accurately plane while exerting pressure using a force F on its central portion 62. This force may be of the order of 20 Newtons, for example. When the force F is removed, the turntable returns to its initial position by virtue of its own elasticity, thereby forming the offset of depth e. The depth e of the offset depends on the applied force F and on the stiffness of the turntable. It may be observed that the turntable 14 can be considered to be a spring.

The countertable 16 is a mechanical part that is relatively simple to manufacture and whose mechanical properties, and in particular stiffness, are easily reproducible from one countertable to another. Countertables 16 thus all have substantially the same mechanical properties, and in particular the same stiffness. On manufacture, any countertables having mechanical properties that are too different from initial specifications are rejected. In contrast, the turntable 14 is a part that is more complicated to manufacture than the countertable 16 and its mechanical properties are not always reproducible and in particular its stiffness is not always reproducible. This is due in particular to the fact that numerous parts, such as electronic components and circuits, are fitted to the turntable.

The method of the present invention for positioning magnetic heads thus consists in holding the magnetic heads on the turntable 14 by tightening screws 70, in fixing the turntable 14 on the countertable 16 (which constitutes a standard component), and in adjusting the positioning of the magnetic head using well known positioning means. These means are usually optical, e.g. an optical bench for metrological use. The final position of the magnetic heads is fixed by gluing, for example. The turntable 14 is then dismounted by undoing the screw 86 and the turntable is then ready for mounting on the countertable 16 of a recorder, knowing that the countertable used in the laboratory for positioning the magnetic heads and the countertable of the recorder are practically identical and in particular have the same mechanical stiffness. It then suffices merely to tighten the screw 86 in such a manner as to bring the peripheral support zones 54 and 94 initially into contact with each other and then to bring the central support surfaces 62 and 92 into contact with each other. For a given turntable, the magnetic heads will always return to the same position when the turntable 14 is fixed on a countertable 16 since the countertables 16 all have the same characteristics. It is thus possible to mount a given turntable on any countertable and to obtain the same positioning for the magnetic heads. It may be observed that this apparatus is used to control the contact pressure on the edges of the countertable. With this assembly, it is possible to position magnetic heads so that their position in the height direction is accurate to within about 1 micron.

It should be observed that the solution which consists in using massive components for the turntable 14 and/or the countertable 16 is impractical because such parts would have too much inertia. In practice, the turntable and the countertable are subjected in magnetic recorders to acceleration that may be as much as 13 g. There would also be a problem of fatigue in the bearings used for holding parts that are too massive. In addition, the electrical power required for quickly accelerating and decelerating the turntable would be too great.

Figure 6:
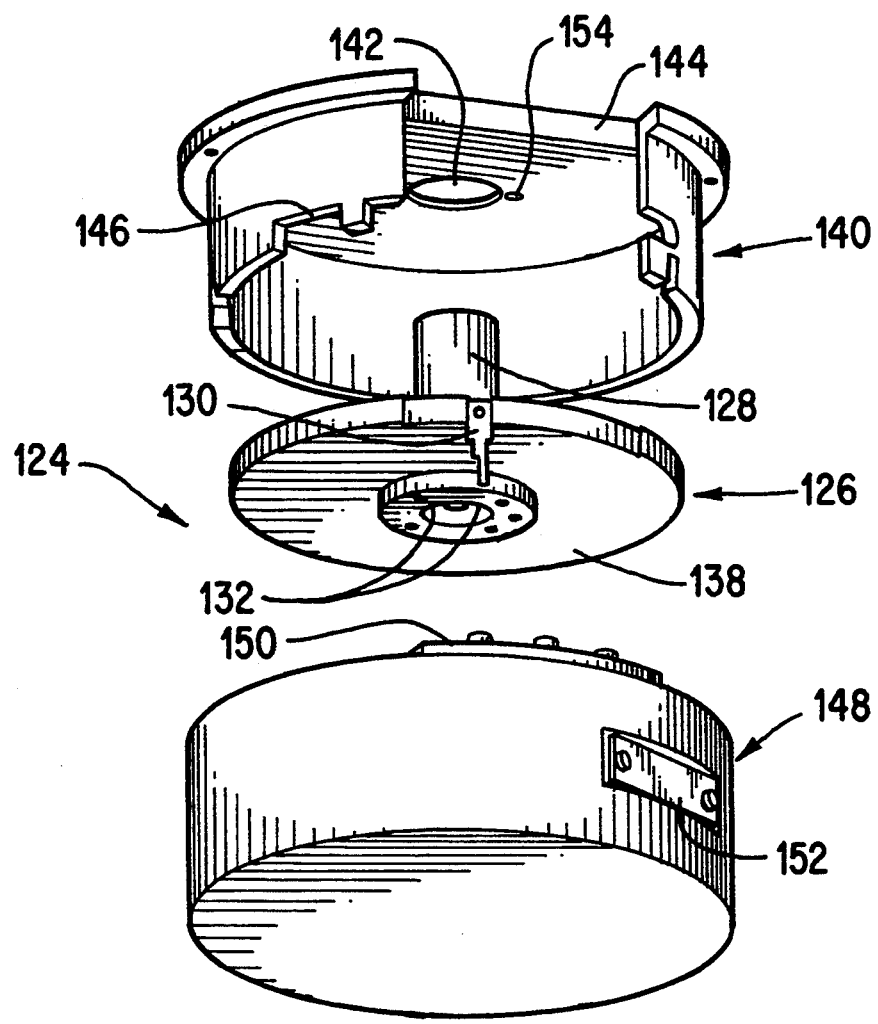
FIG. 6 is an exploded view of a case enabling the turntable to be stored, installed, or removed.

The turntable may advantageously be stored in a case 124 which is shown in an exploded view in FIG. 6 (the turntable is not shown in FIG. 6). The case makes it easy to install and remove the turntable 14 on the countertable 16. The case comprises a turntable support 126 provided with a hollow cylindrical sleeve 128 mounted coaxially with the turntable support 126. A stud 130 is capable of penetrating into the angular indexing slot 78 of the turntable. Two screws 132 can be fixed in threaded housings 134 of the turntable (FIG. 2) so as to fix the turntable to the bottom face 138 of the turntable support. The case also includes a protective box 140 provided with a central recess 142 in which the end of the sleeve 128 of the head support is received. A recess 144 enables the protective box to be angularly positioned relative to the part 104 for holding together the top and bottom drums. The box also includes recesses 146 for the tape guides 24. A lid 148 surrounds and closes the protective box. A cover 150 closes the recess 144 when the box is closed. Finally, a window 152 enables the turntable contained inside the box to be identified.

To remove a turntable fixed on a countertable inside a recorder/reader unit or fixed on a countertable in the laboratory for the purpose of positioning the magnetic heads, for example, the turntable is positioned angularly to take up a given position by means of a retractable indexing finger (not shown). Thereafter the turntable support 126 is placed on the turntable to be removed by putting the stud 130 in the slot 78, and the turntable is screwed into place facing the face 138 of the support 126 by means of the screws 132 engaging in the threaded housings 134 of the turntable. The protective box 140 is then placed on the support 126 which is screwed to the box by a screw passing through the hole 154 of the box 140. Thereafter the central screw 86 for holding the turntable to the countertable is unscrewed. The turntable can then be extracted while fixed to the support 126 and to the support box 140. The lid 148 should then be installed to close the box 140 completely.

To install a turntable on a countertable of a recorder, the same operations are performed in the opposite order. Thus the procedure begins by removing the lid 148, after which the protective box 140 is positioned by means of its recess 144 cooperating with the V-shape of the part 104, the central screw 86 of the turntable is then screwed into the housing 102 of the countertable through the hollow column 128, the two screws 132 holding the support 126 to the turntable are unscrewed, and the turntable is removed from the protective box 140.

It may be observed that the operation of installing or withdrawing a turntable is simple and quick. In addition, because of the apparatus of the invention, the magnetic heads are positioned automatically to an accuracy of the order of 1 micron.

We claim:

1. A method of positioning the rotary magnetic heads of a recorder/reader unit for magnetic tapes, the magnetic heads being fixed at the periphery of a rotary turntable which includes a central surface and a peripheral zone, said turntable being designed to be fixed to a countertable which also includes a central surface and a peripheral zone, the method comprising the following steps:
    a/ said turntable is machined so that said central surface is set back relative to a plane containing said peripheral zone and perpendicular to the axis of rotation of the rotary turntable;
    b/ the turntable is fixed on a standard countertable in a laboratory and the magnetic heads are positioned on the turntable;
    c/ the positioning of the magnetic heads is adjusted and the magnetic heads are fixed to the turntable;
    d/ the turntable is dismounted from the countertable; and
    e/ the turntable is mounted on the countertable of the recorder/reader unit by initially pressing said peripheral zones against each other and then pressing said central zones against each other.

2. A method according to claim 1, wherein the turntable is lapped while exerting greater pressure on its central surface than on its peripheral zone.

3. A method according to claim 1, wherein the turntable is fixed to the countertable by a central screw lying on the axis of rotation of the turntable.

4. A method according to claim 1, wherein between steps d/ and e/, the turntable is placed in a case including a turntable support and a protective box, with the turntable being fixed to said support and with said protective box being fixed to said turntable support.

5. A method according to claim 4, wherein said protective box is closed by a lid.

6. A method according to claim 4, wherein at step e/ the case is positioned angularly relative to the countertable, the turntable is fixed to the countertable by means of a central screw, and the turntable support and the protective box are withdrawn.

7. A method according to claim 4, wherein to withdraw the turntable from said standard countertable or from the countertable of the recorder/reader unit:
    the turntable is placed in a predetermined angular position;
    the turntable support is positioned and fixed on the turntable;
    the protective box is positioned and fixed on the turntable support;
    the turntable is disconnected from said countertable; and
    the assembly constituted by the turntable, the turntable support, and the protective box is extracted from the recorder/reader unit.

8. A method according to claim 7, wherein the assembly comprising the turntable, the turntable support, and the protective box is closed by a lid.

* * * * *